United States Patent

[11] 3,551,666

| [72] | Inventor | George B. Price<br>Pensacola, Fla. |
|---|---|---|
| [21] | Appl. No. | 842,813 |
| [22] | Filed | July 7, 1969 |
| [45] | Patented | Dec. 29, 1970 |
| [73] | Assignee | Monsanto Company<br>St. Louis, Mo.<br>a corporation of Delaware<br>Continuation of application Ser. No.<br>423,719, Jan. 6, 1965, now abandoned. |

[54] STATISTICAL COMPUTER
5 Claims, 2 Drawing Figs.

[52] U.S. Cl. ................................................ 235/179,
235/151.13, 235/196; 323/75
[51] Int. Cl. ............................................... G06g 7/00,
G06f 15/46

[50] Field of Search ............................................ 235/179,
92, 196, 151.13; 323/75

[56] References Cited
UNITED STATES PATENTS

| 2,893,635 | 7/1959 | Gitzendanner............... | 235/92X |
| 3,379,866 | 4/1968 | Williams Jr.................. | 235/179 |
| 2,938,669 | 5/1960 | Henry........................... | 235/179 |

*Primary Examiner*—Eugene G. Botz
*Assistant Examiner*—Felix D. Gruber
*Attorneys*—Stanley M. Tarter and Roy P. Wymbs

ABSTRACT: Taps on parallel potentiometers are stepped so that the voltage across a load is increased in equal increments of a first magnitude for each acceptable sample, and decreased by equal increments of a different magnitude for each rejected sample. The load responds to variation of voltage above and below preset limits.

PATENTED DEC 29 1970  3,551,666

INVENTOR.
GEORGE B. PRICE
BY Kelly O. Corley
ATTORNEY

STATISTICAL COMPUTER

The present application is a continuation of applicant's copending application Ser. No. 423,719, filed Jan. 6, 1965 (and now abandoned).

The present invention concerns an analyzer or computer which determines the relationship between two input variables in terms of electrical voltages and which determines when the observed relationship departs from a given preset relationship.

Occasions arise wherein it is desired to determine when the relationship between two quantities varies outside of a given range. As an example, certain quality control or inspection plans are used to maintain a given quality level with a minimum of actual inspection. A typical plan involves sequential sampling wherein individual units of a lot are inspected for conformity to given quality standards. It may be desired to reject the entire lot if the "reject" level is discovered by such sequential sampling to be too high, and to pass the lot if rejects are below a certain lower level.

The present invention is illustrated in such an environment, although the applications for the herein disclosed method and apparatus are not so limited.

Accordingly, a primary object of the invention is to provide an electrical analyzer for comparing two observed input variables with a predetermined relationship;

A further object is to provide an analyzer of the above character which determines when the observed relationship departs from the predetermined relationship;

A further object is to provide an analyzer wherein the predetermined relationship may be readily varied;

A further object is to provide an analyzer which is simple, reliable in operation and economical.

Other objects of the invention will in part be obvious and will in part appear hereinafter.

The invention accordingly comprises the several steps and the relation of one or more of such steps with respect to each of the others, and the apparatus embodying features of construction, combinations of elements and arrangement of parts which are adapted to effect such steps, all as exemplified in the following detailed disclosure, and the scope of the invention will be indicated in the claims.

For a more complete understanding of the nature and objects of the invention, reference should be made to the following detailed description taken in connection with the accompanying drawing, in which.

Figure 1:
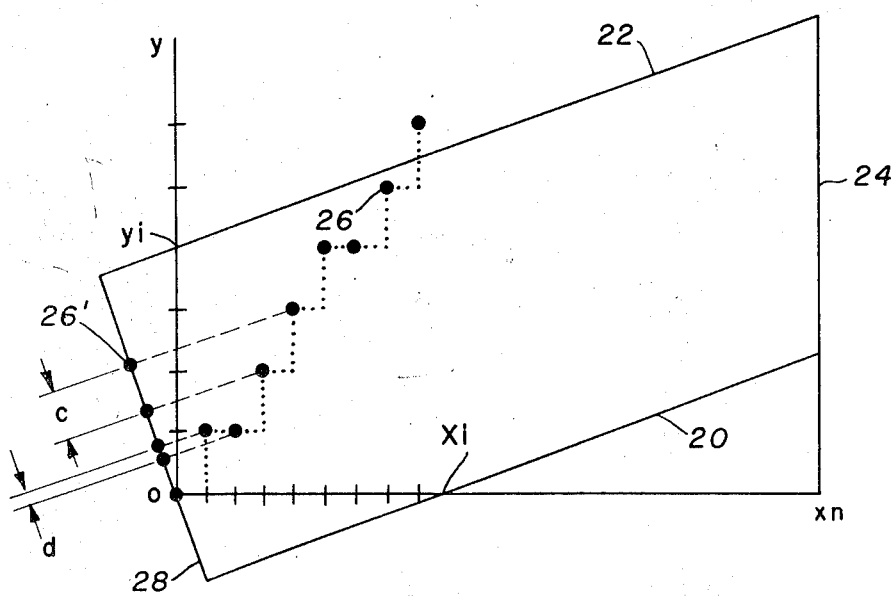
FIG. 1 is a graph illustrating the theory of the invention.

Referring now to FIG. 1, there is illustrated a graphic representation of a typical sequential sample quality control plan. As shown therein the X axis is laid out along the abscissa and the Y axis is laid out along the ordinate, the axes intersecting at the origin. A pair of parallel lines 20 and 22 are laid out on the graph with intercepts at "$Xi$" and "$Yi$". The X axis is laid off to a scale representing the number of units inspected, while the Y axis is laid off to a scale representing the number of unacceptable or rejected items. $X_n$ represents the total number of units in a given lot. A line 24 vertical to the X axis and intersecting the X axis at $X_n$ completes the graph. The slopes of lines 20 and 22, the intercepts $Xi$ and $Yi$, the value of $X_n$ and other characteristics are determined by well known statistical methods and procedures.

The use of the FIG. 1 chart may be demonstrated by the following considerations. Consider a point 26 starting at the origin and movable horizontally to the right in increments of X and movable vertical in increments of Y, as in the exemplary path shown in dotted lines. If a unit is inspected and found acceptable, the point 26 moves horizontally to the right one X unit. If a unit is inspected and rejected, the point moves horizontally to the right one X unit and vertically upward one Y unit. This is repeated for each unit inspected until the point reaches or crosses one of the lines 20, 22 or 24. The region below and to the right of line 20 may be considered as the "accept" region, the region above and to the left of line 22 is the "reject" region and the area between lines 20 and 22 is an area of "indecision," which requires further sampling before a decision is reached. If point 26 crosses line 22, the entire lot would be rejected without further inspection since the number of rejected units exceeds the number permitted by the graph. Conversely, if point 26 crosses line 20, the entire lot would be accepted without further sampling. As long as point 26 remains in the region between lines 20 and 22, sampling is continued; and if point 26 remains in the area of indecision until line 24 is reached, the lot will have been 100 per cent inspected. Note that the area between lines 20 and 22 represents an area of indecision and determines the permissible range of variation permitted between accepted and rejected units before a decision is made to either reject or accept the entire lot.

While the FIG. 1 sampling plan could be administered with printed charts by physically plotting the movement of point 26 after each unit is sampled, such a procedure would be costly, time consuming and difficult, as well as susceptible to errors. The present invention provides for administering the sampling plan by feeding into a computer signals corresponding to the accepted and rejected units, with the decision to accept, reject or continue sampling being made by the computer in accordance with the preselected plan.

Still referring to FIG. 1, a further line 28 may be constructed through the origin normal to lines 20 and 22. From each position of point 26, a projection 26' may be made to line 28 as shown by dashed lines which extend parallel to lines 20 and 22. This projection 26' moves along line 28 toward line 22 a distance $c$ each time point 26 moves to represent a rejected unit, and moves along line 28 away from line 22 a distance $d$ each time point 26 moves to represent an accepted unit. Thus the position of projection 26' with respect to the origin is determined by sequentially, algebraically adding negative $c$ units and positive $d$ units corresponding to the sequence of movement of point 26.

According to the present invention, apparatus is provided which includes an electrical analogue of the position of projection 26' on the graph. In a particular embodiment, electrical voltage is incrementally added to and subtracted from a load circuit to correspond to the movement of projection 26'.

Figure 2:
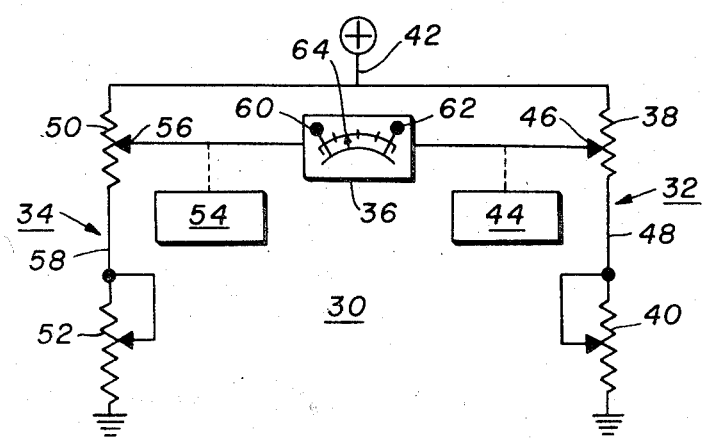
FIG. 2 is a simplified schematic circuit diagram of the preferred embodiment of the invention.

FIG. 2 illustrates a simplified electrical bridge circuit 30 comprising accept and reject legs 32 and 34, respectively, arranged as illustrated to form an electrical bridge wherein the voltage appearing across load impedance 36 is incrementally increased and decreased to correspond to the movement of projection 26'. Load 36 should be of the type which respond to either of two different conditions of bridge unbalance, such as two different voltages. For example, load 36 may be a meter relay.

Leg 32 includes potentiometer 38 and variable resistor 40 connected in series between power supply terminal 42 and a point of fixed reference potential, together with signal means 44 for stepping tap or wiper 46 along potentiometer 38 by a fixed resistance increment away from reset terminal 48 for each occurrence of the accept signal. Each actuation of signal means 44 will thus increase the potential on wiper 46 by a fixed fraction of the total voltage appearing across potentiometer 38.

Similarly, leg 34 includes potentiometer 50 and variable resistor 52 connected in series between terminal 42 and the point of reference potential, together with signal means 54 for stepping tap or wiper 56 along potentiometer 50 by a fixed resistance increment away from reset terminal 58 for each occurrence of the reject signal. Variable resistors 40 and 52 thus constitute coupling means for connecting lower ends of respective potentiometers 38 and 50 to the grounded supply terminal.

For simplicity of explanation, it may be assumed that the corresponding components of legs 32 and 34 are identical, although this is not essential. Signal means 44 and 54 may be simple manually actuated mechanical devices, such as ratchet mechanisms, or may be of other types such as electrical rotary stepping motors, et cetera.

The output signals on wipers 46 and 56 each increase in the same direction with additional actuations of their respective signal means; however, since they are applied to opposite meter terminals (i.e., since these output signals are connected to oppose one another), the resulting voltage applied to meter 36 will correspond to the algebraic sum of the "accept" and the "reject" signals similar to the displacement of projection 26'. Leg 32 thus constitutes a first signal voltage source or power supply which is variable in steps of equal voltage increments, while leg 34 constitutes a second signal voltage source or power supply which is also variable in steps of equal voltage increments.

It may be seen that if wiper 46 is moved up one step for each "accept" item, an incremental voltage increase corresponding to $d$ will be applied to meter 36, and similarly each step of wiper 56 will apply an opposing incremental voltage corresponding to $c$ to meter 36, if the relative amplitudes of these ncremental increases are properly selected. Adjustment of variable resistors 40 and 52 affords a simple adjustment of the amplitude of the $d$ signal on wiper 46 as compared to the amplitude of the $c$ signal on wiper 56, by independently increasing or decreasing the total voltage applied to their respective potentiometers. When wipers 46 and 56 are reset, the voltage applied to load 36 corresponds to the origin in the FIG. 1 graph, while the different degrees of unbalance to which load 32 responds corresponds to lines 20 and 22 in FIG. 1. If load 36 is a meter relay, as illustrated, adjustable contacts 60 and 62 correspond to lines 20 and 22, respectively, while the position of needle 64 represents the position of projection 26'.

To exemplify the invention, each of potentiometers 38 and 50 and variable resistors 40 and 52 may be variable from 0—10 kilohms, although other values may be used for any or all of these elements, depending on the particular application involved. Load 36 should have a high input impedance so as to avoid nonlinearities due to loading of the circuit, since the source impedance as viewed from load 36 changes with the position of the wipers. A high-input impedance amplifier may be incorporated between each wiper and the load, to prevent such loading effects.

While the invention has been disclosed for the sake of simplicity as including resistors in a voltage divider arrangement across a DC source, other impedances may be used in a similar arrangement with either an AC or a DC source. AC may be used if load 36 is selected to respond to the phase of the voltage across wipers 46 and 56 as well as to the amplitudes corresponding to lines 20 and 22. With a sufficiently sensitive load 36, the amplifiers may be dispensed with in any case. The instrument may respond to automatic rather than manual actuation of the stepping switches. Also, the instrument may be arranged to incrementally decrease the voltage on wipers 46 and 56, rather than to increase these voltages, if desired.

Accordingly there has been disclosed in the above specification and the accompanying drawing an analyzer which determines the relationship between two input variables in terms of voltages, and which determines when the observed relationship departs from a given preset relationship. In the preferred embodiment, the output signal comprises two opposing components, each of which is increased in accordance with its respective input variable. Advantageously the total variation in voltage is determined by an electrical bridge arrangement. The disclosed apparatus permits ready adjustment in order to conform with a desired inspection plan, by appropriate adjustment of the contacts 60 and 62 on meter relay 36 and of the several impedances as above described. The disclosed apparatus is simple, reliable in operation and economical.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

I claim:
1. An analyzer comprising in combination:
   A. First and second load terminals;
   B. Means for applying a voltage across said load terminals;
   C. First signal means for increasing said voltage across said load terminals by a first increment in response to each occurrence of a first signal, each of said first increments having the same given amplitude as each other of the said first increments;
   D. Second signal means for decreasing said voltage across said load terminals by a second increment in response to each occurrence of a second signal, each of said second increments having the same amplitude as each other of said second increments, the amplitude of said first increments being different from the amplitude of said second increments; and
   E. Load means responsive to variations of the value of the voltage across said terminals above a first higher voltage limit and below a second lower voltage limit, said load means being connected across said load terminals.

2. The analyzer defined in claim 1, further comprising means for adjusting the ratio of said first given amplitude to said second given amplitude.

3. The analyzer defined in claim 2, wherein said load means includes a meter relay.

4. A process comprising:
   A. Producing on a first load terminal a voltage with respect to a second load terminal;
   B. Changing said voltage in a first direction by a first increment in response to each occurrence of a first signal, each of said first increments having the same amplitude as each of the other of said first increments;
   C. Changing said voltage in the direction opposite said first direction by a second increment in response to each occurrence of a second signal, each of said second increments having the same amplitude as each of the other of said second increments, the amplitude of said first increments being different from the amplitude of said second increments; and
   D. Detecting variation of said voltage outside a voltage range defined by a first higher voltage limit and a second lower voltage limit.

5. A process, comprising:
   A. Producing on a first terminal a first voltage with respect to a point of reference potential;
   B. Producing on a second terminal a second voltage with respect to said point of reference potential;
   C. Changing said first voltage in a first direction by a first increment in response to each occurence of a first signal, each of said first increments being of the same amplitude;
   D. Changing said second voltage in said first direction by a second increment in response to each occurrence of a second signal, each of said second increments being of the same amplitude, the amplitude of said second increments being different from the amplitude of said first increments; and
   E. Detecting when the voltage difference between said first and said second terminals varies outside a predetermined range of values determined by a first upper voltage limit and a second lower voltage limit.